No. 700,381. Patented May 20, 1902.
J. W. SHERMAN.
THEATRICAL APPLIANCE.
(Application filed Dec. 28, 1900.)

(No Model.) 2 Sheets—Sheet 1.

WITNESSES:
A. R. Appleman
L. Duane.

INVENTOR
John W. Sherman,
BY
J. R. Littell
his ATTORNEY

No. 700,381. Patented May 20, 1902.
J. W. SHERMAN.
THEATRICAL APPLIANCE.
(Application filed Dec. 28, 1900.)
(No Model.) 2 Sheets—Sheet 2.
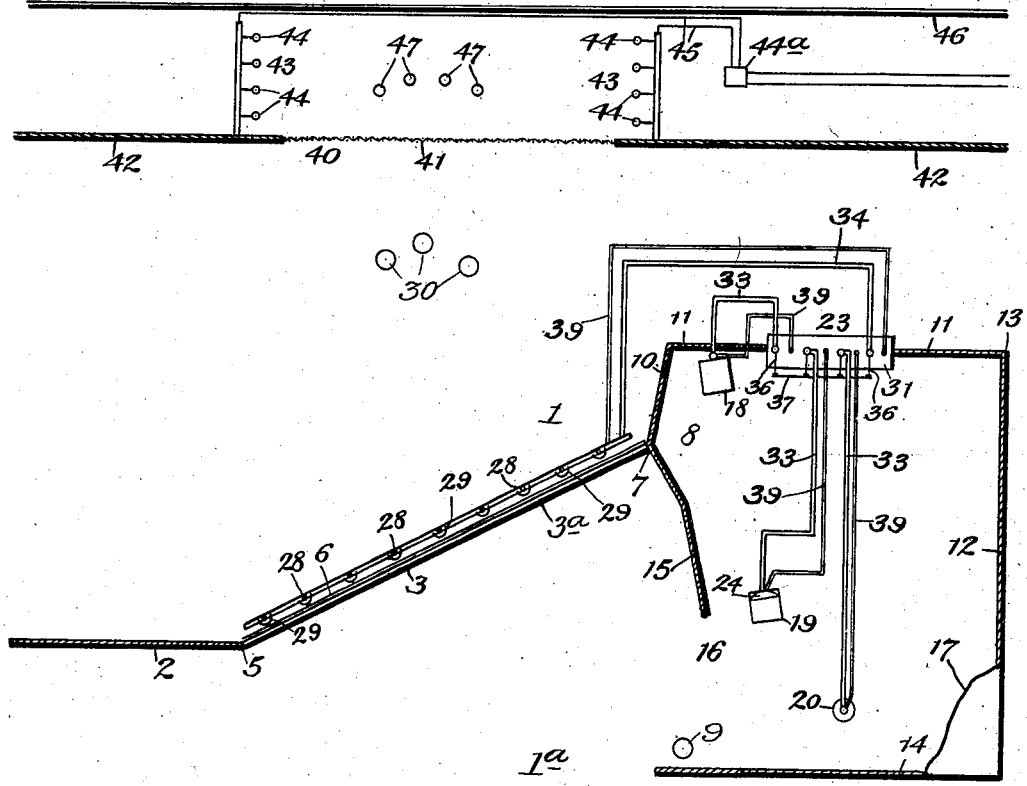
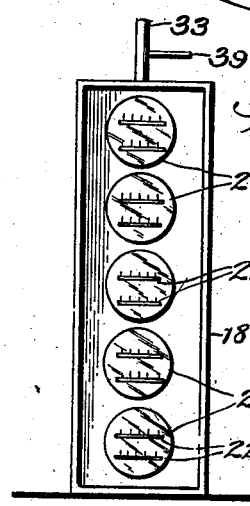
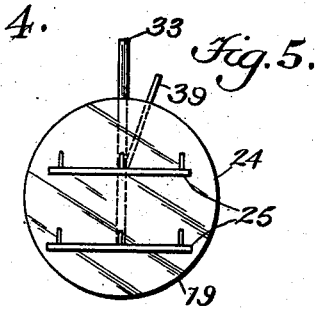
WITNESSES: INVENTOR
John W. Sherman,
BY
his ATTORNEY

UNITED STATES PATENT OFFICE.

JOHN W. SHERMAN, OF NEW YORK, N. Y., ASSIGNOR TO HIMSELF AND JULIA LOUISE SHERMAN, OF NEW YORK, N. Y.

THEATRICAL APPLIANCE.

SPECIFICATION forming part of Letters Patent No. 700,381, dated May 20, 1902.

Application filed December 28, 1900. Serial No. 41,359. (No model.)

*To all whom it may concern:*

Be it known that I, JOHN W. SHERMAN, a citizen of the United States, residing at New York, in the county and State of New York, have invented certain new and useful Improvements in Theatrical Appliances, of which the following is a specification.

This invention relates to theatrical appliances and to that class of theatrical appliances whereby optical illusions are produced; and it has for its object to provide an improved appliance of this class whereby dissolving views, transformation scenes, and other spectacular displays and illusions may be presented upon the stage in connection with or separately from suitable theatrical performances, representations, or pantomimes.

In carrying out my improved invention I employ a transparent screen which is extended across the stage at such an angle with the front of the stage that the image of an object or person or number of the same arranged at one side of the stage will be reflected into the auditorium-space of the theater. I further employ a supplemental foraminous opaque screen which is arranged transversely of the stage in a plane rearward of the transparent screen and which is decorated or configured to simulate a portion of the stage setting or scenery. In connection with the transparent screen and the foraminous screen I employ suitably-arranged lighting means and suitable controlling means for the same for the purpose of completing and enhancing the several illusionary effects.

Figure 1:
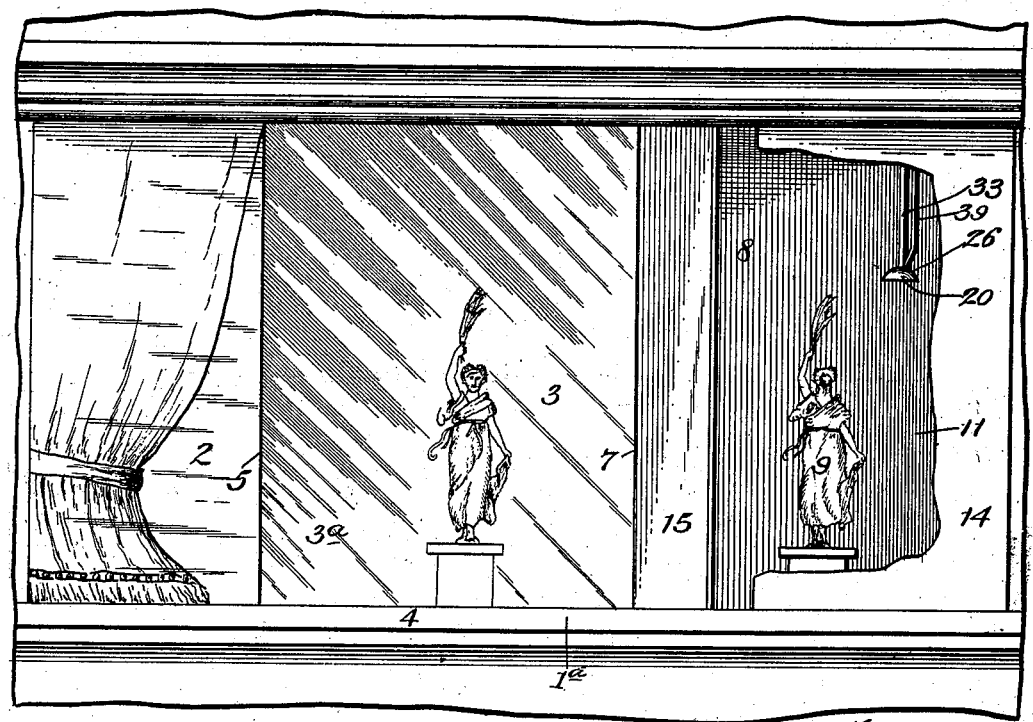
Figure 3:
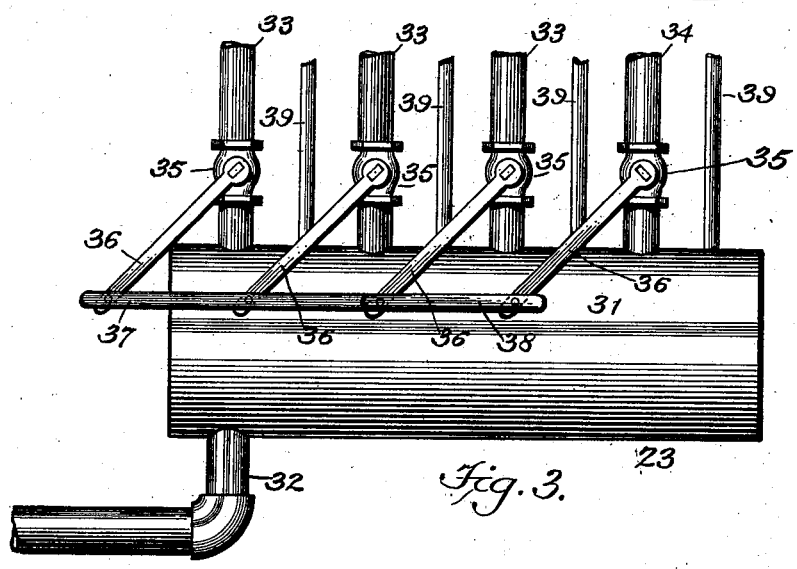

In the drawings, Figure 1 is a front elevation of my improved theatrical appliance in operative position upon the stage, parts being broken away to show details of interior construction. Fig. 2 is a plan view of the same. Fig. 3 is a detail front elevation of the controlling means for the lighting means. Fig. 4 is a detail front elevation of a portion of lighting means. Fig. 5 is a detail front elevation of a further portion of the lighting means. Fig. 6 is a detail or bottom plan view of a still further portion of the lighting means.

Corresponding parts in all the figures are denoted by the same reference characters.

Referring to the drawings, 1 designates my improved theatrical appliance, which is arranged upon the stage (illustrated at $1^a$) and is preferably inclosed at the sides and top by set scenes or flies 2.

3 designates the transparent screen, which is vertically arranged upon the stage in a plane at an angle with the vertical plane of the front of the stage, (represented at 4 in Fig. 2.) The transparent screen 3 in the preferred form of construction consists of a single sheet of pure or plate glass 4, which abuts at one side edge, as at 5, against a part or portion of the inclosing set scenes or flies 2. The transparent screen 3 is provided with a backing 6, of black wire-cloth or similar suitable material, and the backing 6 increases the reflecting power of the screen 3 without preventing the passage of light through the same in producing certain illusionary effects. The side edge of the transparent screen 3 which is farthest from the front of the stage abuts, as at 7, against a cabinet or compartment 8, which is arranged at one side of the stage and in which, as at 9, is positioned the person or object which, according to my invention, is reflected into the auditorium of the theater by the transparent screen 3.

The cabinet 8 in the preferred form of construction consists of a member 10, which extends rearwardly from the side edge of the transparent screen 3, a member 11, which extends transversely of the stage from the rearmost edge of the member 10, a member 12, which extends forwardly from the extreme side edge portion 13 of the member 11, and a member 14, which extends transversely of the stage parallel with the member 11 and forms the front wall of the cabinet 8. A wing or member 15 is also arranged to partially close the opening, as at 16, at the side of the cabinet 8 nearest the center of the stage or nearest the transparent screen 3, and said wing 15 extends from the side edge 7 of the transparent screen forwardly. This wing 15 may be decorative, constituting a portion of the set scenery, or may be simply a blank, such as the walls of the cabinet 8. The walls of the cabinet are covered with a lusterless black fabric, which will absorb all the rays of light thrown upon said walls, and the cabinet 8 is inclosed at the top by a lusterless black and fireproof fabric covering 17. (Shown partially broken away in Fig. 2.)

The lighting means for the cabinet 8 consist of three clusters or installations of lights 18, 19, and 20, respectively, of which the cluster 18 is arranged at a point obscured by the wing 15 from the auditorium of the theater and adjacent the point of connection of the members 10 and 11 of the cabinet. The cluster 18 is thus arranged at the back of the cabinet and in the preferred form of construction consists of five reflectors 21, arranged in a vertical series, there being two rows of gas-jets 22 provided for each reflector, and each row of gas-jets is separately supplied and controlled by controlling means 23, arranged also at the back of the cabinet 8. The cluster of lights 19 is arranged upon the floor of the stage at a point slightly rearward of the exhibiting position 9 of the person or object upon which the illusionary effect is based, as illustrated in Fig. 2. The cluster 19 consists of a reflector 24 and a suitable number (preferably six) of gas-jets 25, which are arranged forwardly of the same. The cluster 20 consists of a reflector 26 and a suitable number of gas-jets 27, arranged at a point directly above the exhibiting position 9 of the figure or object.

It will be noted from the above specific relative arrangement of the light-clusters 18, 19, and 20 with respect to the exhibiting position 9 of the object or person that the light emanated from the cluster 18 will be thrown directly upon the portions of the object or figure at 9 which are directly exposed to the reflecting-surface of the transparent screen 3. The light-cluster 19 similarly will cause the concentration of light-rays upon the person or object at 9 and will supplement the illumination caused by the illuminating light-rays from the cluster 18, and the light from the cluster 20 will be shed down upon the object or person at 9 in such a manner as to prevent the formation of any shadows which said object or person might cast in the path of the rays of light from the clusters 18 and 19. This relative arrangement of the several clusters of the lighting means causes the presentation to the transparent screen 3 of the clear-cut image, which will be re-presented or reflected by said transparent mirror into the auditorium.

Behind the transparent screen 3 and upon a level with the stage are arranged a transverse series of lights 28, forwardly of each of which is arranged a suitable reflector 29, whereby the rays of light from the lights 28 are cast rearwardly to illuminate the person or object 30 upon the stage.

The lighting means 23 comprise a gas-tank or reservoir 31 (illustrated in detail in Fig. 3) and a supply-pipe 32 for the tank 31, line-pipes 33 extending between the tank 31 and the several clusters 18, 19, and 20, and a supply-pipe 34 extending between the gas-tank and the series of lights 28, which are arranged rearwardly of the transparent screen 3. Each of the pipes 33 and 34 is provided with a cock or valve 35, whereby the supply of gas through the same from the gas-tank may be regulated or may be entirely shut off by means of levers 36, one of which is operatively connected with each of the cocks or valves 35. The levers which are connected with the cocks or valves 35 of the line-pipes 33 are operatively connected in a working series by a link-arm 37, and the lever 36, which is connected with the cock or valve of the line-pipe 34, is connected with the aforesaid series of levers 36, which are operatively connected by a link-arm 38. The cock or valve 35 of the line-pipe 34 and the cocks or valves 35 of the line-pipes 33 are so relatively set in their respective line-pipes that when the cock or valve of the line-pipe 34 is turned to permit the passage of gas to the series of lights 28 the cocks or valves 35 of the line-pipes 33 are in position to shut off the supply of gas from the light-clusters 18, 19, and 20. A pilot or supplemental line-pipe 39 is provided for each of the line-pipes 33 and 34, and the pilot 39 permits a continuous supply of gas to the light-clusters 18, 19, and 20 and to the series of lights 28, whereby all of the lights are prevented from extinction even when the cocks or valves 35 are so turned as to cut off the supply of gas through the line-pipes 33 and 34. It will be noted that by relatively setting the cocks or valves 35 as above stated the manipulation of the link-arm 38 to shut off the supply of gas from the light-clusters 18, 19, and 20 will establish a supply of gas to the series of lights 28, and vice versa.

Rearwardly of the transparent screen 3 and of the point of exhibition or arrangement of the object or person 30 is arranged a foraminous screen 40, which in the preferred form of construction consists of a scrim or gauze sheet 41, which is flanked at the sides by flies or set scenes 42 and which is decorated or configured to simulate an extended portion of the flies and set scenes 42. Rearwardly and laterally of the foraminous screen 40 and at each side of the stage is arranged a series of lights 43, which preferably consist of incandescent electric bulbs 44, the supply of electric current to which may be controlled by the same person who operates the controlling means 23, and this control may be permitted by an electric switch 44ª, installed in an electric circuit which includes the lights 43 and embodies suitable line-wires 45. The back scenery 46 is arranged transversely of the stage rearwardly of the foraminous screen 40, and the object or person 47, upon which is based the illusionary effect obtained in combination with the foraminous screen 40, is stationed directly behind the screen 40 and forwardly of the back scenery 46.

The operation and advantages of my improved theatrical appliance will be readily understood by those skilled in the art to which it appertains.

It will be understood that the space between the transparent screen 3 and the foraminous screen 40 constitutes the working space of the stage upon which the main action transpires. By means of the cabinet 8 and the lighting means therein arranged and the transparent screen 3, together with its backing 6, effective illusionary effects may be produced by throwing the image or images of the object or person or several of the same onto the transparent screen and seemingly into a position coincident with or adjacent to the position of the object or person or group of the same represented at 30 in the rear of the transparent screen. During the performance or action upon the stage rearwardly of the transparent screen 3 the series of lights 28, which serve as footlights, are caused to burn brightly and the light-clusters 18, 19, and 20 within the cabinet 8 are caused to burn low, and this relative power of the lights within the cabinet and the lights rearwardly of the transparent screen is caused by the proper manipulation of the controlling means 23. To turn down or dim the lights 28 and turn up or increase in potential the lights of the several clusters 18, 19, and 20 within the cabinet 8, or vice versa, it is only necessary for the operator to suitably move the link-arm 37, by which the levers 36 of the controlling means are connected. When the lights 28 behind the transparent screen 3 are turned down or dimmed and the lights of the several clusters 18, 19, and 20 are turned up or increased in power and an object or person or number of the same, as represented at 9, is suitably positioned within the cabinet 8, the image or images of the latter will be thrown upon the transparent screen 3, and thus be reflected into the auditorium of the theater, where it will appear to be coincident with or adjacent to the position of the object or person or number of the same, as represented at 30. An expert manipulation of the controlling means 23 will cause the said image to fade or brighten in an effective manner, and this produces the effect of a dissolving view. Simultaneously the object or person represented at 30 will approximately fade from sight or come strongly into view behind the transparent screen 3 and the combined effect will produce an extremely effective optical illusion. The box-like formation of the cabinet 8 shuts off from view and effectively screens from the auditorium the object or person within the cabinet 8 and upon which the illusion is based, and said cabinet is only open at the side adjacent the center of the stage sufficiently to permit the projection of the illusionary image upon the transparent screen. It will be understood that the backing 6, with which the transparent screen is provided, is sufficiently opaque in its nature to give the transparent screen a reflecting nature, while being at the same time sufficiently open in formation to permit viewing from the auditorium of the action upon the stage.

The transparent screen 3 may be employed as a reflector for objects positioned within the cabinet 8 without combining the illusionary effects thus produced with the optical effects produced by exhibition of objects or persons upon the stage rearwardly of the transparent screen.

In employing the imperforate screen 40 the person or object to be displayed through said imperforate screen is positioned behind the same and forwardly of the back scenery 46, as at 47, and the lights 43 are turned on and off by the operator by means of the switch 44$^a$, and may, if desired, be caused to gradually increase and decrease in power by the employment of a suitable rheostat or dimmer such as commonly used in theaters. When a person or object or a number of the same are arranged upon the stage rearwardly of the imperforate screen, as at 47, and the lights 43 are turned on, the illusionary effect of images projected upon the imperforate screen will be presented. These illusionary effects may be combined with the illusionary effects obtained by means of the cabinet, the transparent screen, and the object or person, or a number of the same, which are exhibited and illuminated within the cabinet. Also objects or persons may be simultaneously exhibited upon the stage and rearwardly of the imperforate screen, and it is thus possible by means of my improved theatrical appliance to obtain a number of separate or combined illusionary effects. When all the illusionary effects are combined, the several images may be caused to merge into one another and to dissolve and be re-presented in a most effective and startling manner.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. In a theatrical appliance of the class described, a transparent reflecting-screen arranged upon the stage at an angle with the plane of the front of the stage, said transparent reflecting-screen being provided with a foraminous backing, a compartment arranged at one side of said screen, lighting means for said compartment, lighting means arranged rearwardly of said screen, and controlling means whereby the lighting means for said compartment and the lighting means rearwardly of said screen may be varied in relative power.

2. In a theatrical appliance of the class described, a transparent screen arranged vertically upon the stage at an angle with the plane of the front of the stage, said screen being provided with a foraminous backing, lighting means arranged forwardly of said screen, lighting means arranged rearwardly of said screen, and controlling means whereby said lighting means forwardly of said screen and said lighting means rearwardly of said screen may be varied in relative power.

3. In a theatrical appliance of the class described, a transparent screen arranged vertically upon and obliquely transversely of the stage, a cabinet arranged at one side of the stage and adjacent the side edge of said transparent screen farthest from the front of the stage, a foraminous or gauze screen arranged rearwardly of said transparent screen, lighting means for said cabinet, lighting means arranged rearwardly of said transparent screen, lighting means arranged rearwardly of said foraminous or gauze screen, and controlling means for each of said lighting means whereby the powers of said several lighting means may be relatively varied.

4. In a theatrical appliance of the class described, a transparent screen arranged vertically upon and obliquely transversely of the stage, and a foraminous or gauze screen arranged rearwardly of said transparent screen, lighting means arranged rearwardly of said transparent screen, lighting means arranged rearwardly of said foraminous or gauze screen, and controlling means for each of said lighting means whereby the powers of said several lighting means may be relatively varied.

5. In a theatrical appliance of the class described, a transparent reflecting-screen arranged vertically upon the stage at an angle with the plane of the front of the same, said transparent reflecting-screen being provided with a foraminous backing, substantially described and for the purposes specified.

6. In a theatrical appliance of the class described, a transparent reflecting-screen arranged vertically upon and obliquely transversely of the stage, said transparent screen being provided with a foraminous backing, and a foraminous or gauze screen arranged rearwardly of said transparent screen and transversely of the stage.

In testimony whereof I have signed my name in the presence of the subscribing witnesses.

JOHN W. SHERMAN.

Witnesses:
J. R. LITTELL,
GEO. VAIL HUPPERTZ.